United States Patent [19]

Winters

[11] 4,333,326
[45] Jun. 8, 1982

[54] BRAKE AND CLUTCH LOCK ASSEMBLY

[76] Inventor: Robert E. Winters, 519 W. 16th Pl., Chicago Heights, Ill. 60411

[21] Appl. No.: 169,833

[22] Filed: Jul. 16, 1980

[51] Int. Cl.³ .................... B60R 25/00; G05G 5/06
[52] U.S. Cl. ........................................ 70/203; 70/237
[58] Field of Search .................. 70/203, 200, 39, 237

[56] References Cited

U.S. PATENT DOCUMENTS

| 1,025,180 | 5/1912 | Wreford | 70/203 |
| 1,097,081 | 5/1914 | Coon | 70/203 |
| 1,131,720 | 3/1915 | McCray | 70/203 |
| 1,193,202 | 8/1916 | Swanson | 70/203 |
| 1,318,443 | 10/1919 | Gimperling | 70/200 |
| 1,338,131 | 4/1920 | Hendricks | 70/203 |
| 1,350,526 | 8/1920 | Slaughter | 70/200 |
| 1,371,886 | 3/1921 | Gage | 70/203 |
| 1,388,149 | 8/1921 | Friedrich | 70/203 |
| 1,558,628 | 10/1925 | Purcell | 70/203 X |
| 1,566,885 | 12/1925 | Laska | 70/200 |
| 3,435,646 | 4/1969 | Michnoff | 70/203 |
| 4,076,095 | 2/1978 | Adamski | 70/237 X |

FOREIGN PATENT DOCUMENTS

| 840612 | 1/1939 | France | 70/203 |
| 348681 | 5/1931 | United Kingdom | 70/203 |
| 1007711 | 10/1965 | United Kingdom | 70/237 |
| 1383641 | 2/1975 | United Kingdom | 70/237 |

Primary Examiner—Roy D. Frazier
Assistant Examiner—Carl F. Pietruszka
Attorney, Agent, or Firm—Sabin C. Bronson

[57] ABSTRACT

An improved vehicle lock immobilizes the shaft of a single foot pedal assembly of the vehicle is disclosed. The vehicle lock comprises a base which contacts the floor of the vehicle and fits between the floor and the shaft of the pedal. Two wall members extend upwardly from one end of the base and together with the base form a cradle for the shaft. A lock mechanism, e.g., a pad-lock, passes through one or more holes in each of the walls to thereby lock the shaft in the cradled position and render the pedal assembly and vehicle inoperative.

1 Claim, 5 Drawing Figures

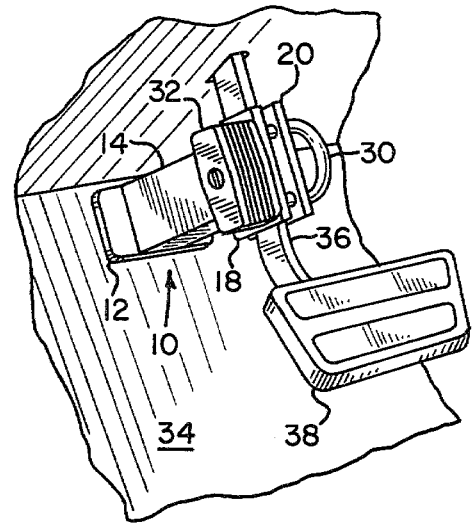
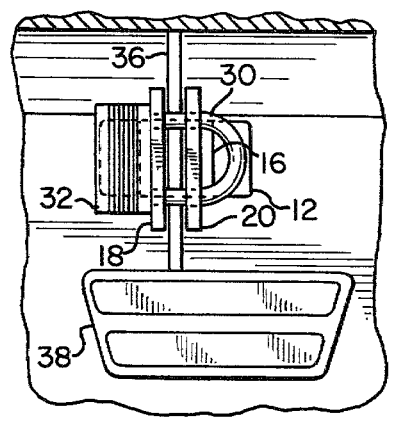
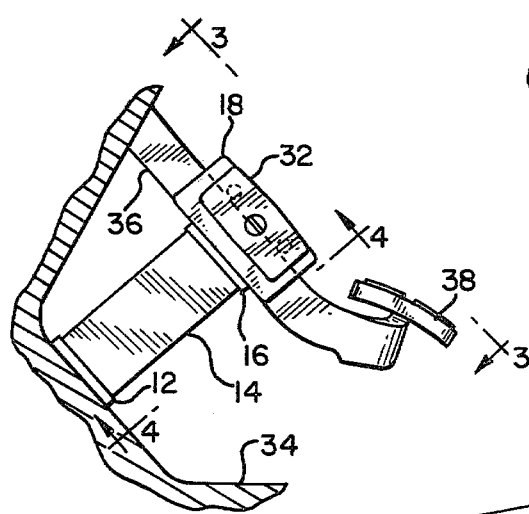
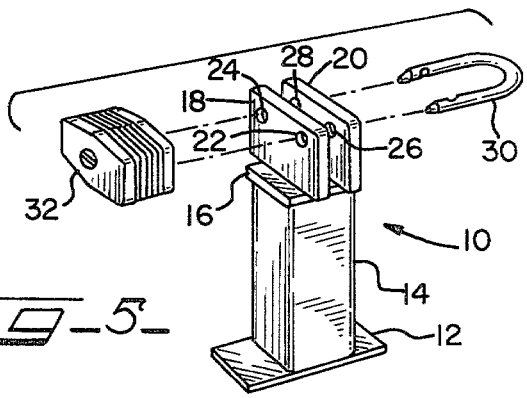

BRAKE AND CLUTCH LOCK ASSEMBLY

BACKGROUND AND SUMMARY OF THE INVENTION

This invention relates to an improved security device for vehicles. More particularly, the invention relates to a system suitable for immobilizing a foot pedal assembly, e.g., accelerator, brake and clutch, used to control the vehicle, thereby rendering the vehicle inoperative and safe from theft.

Theft of vehicles, e.g., autos, trucks and the like, is a major crime problem. Many anti-theft systems have been suggested by the prior art. A number of patents have been directed to devices for locking the pedals used to control the operation of the vehicle.

Many of the prior pedal lock devices were relatively complex and/or involved a specific configuration of pedals, for example, a three pedal configuration including accelerator, brake and clutch. Today's vehicles often do not include a clutch pedal, for example, because of the use of automatic transmissions. Even with only two pedals, each manufacturer positions the pedals differently making it very difficult, if not impossible to design a multi-pedal lock system having wide applicability.

Therefore, one object of the present invention is to provide an improved anti-theft device for vehicles.

Another object of the present invention is to provide an apparatus for locking a single foot pedal assembly used to at least partially control the operation of a vehicle.

A still further object of the present invention is to provide a vehicular foot pedal assembly lock which is of relatively straight forward construction, easy to operate and maintain, and is reliable. These and other objects and advantages of the present invention will become apparent hereinafter.

An improved vehicular pedal-lock has now been discovered. The present system is useful for substantially immobilizing the shaft of a single foot pedal assembly (and also the foot pedal assembly itself) effective to at least partially control the operation of a vehicle, e.g., automobile, truck and the like. The present system comprises a base having a first end and a second end. This base is sized so as to be capable of fitting, preferably substantially snugly fitting, between the floor of the vehicle and the shaft of the pedal assembly. In use, the first end of the base is in contact with the vehicular floor.

First and second wall elements are included. These elements extend upwardly from the second end of the base and are spaced apart so as to be capable of cradling the pedal shaft between the wall element and the second end of the base. That is, in use the wall elements and second end of the base form a three sided "cradle", into which the pedal shaft is positioned. Preferably, the shaft fits into this cradled position when no extraneous pressure, e.g., foot pressure, is applied to the pedal assembly. In other words, preferably the pedal shaft fits into the cradle formed by the wall element and the second end of the base when the foot pedal assembly is in the rest position or mode. Each of the wall elements has at least one hole, or preferably two holes, which pass through the wall element. These holes are preferably located substantially equidistant up from the second end of the base.

The present system further includes a locking mechanism, preferably comprising a key-operated pad-lock. This locking mechanism is capable of acting to pass through at least one hole, preferably two holes, in each of the wall elements described above to effectively lock the shaft of the foot pedal system assembly in the cradled position and render the foot pedal assembly effectively inoperative.

Thus, the present locking system is seen to be of relatively simple construction; to be easy to engage with and remove from the foot pedal assembly; to be easy to maintain; and to provide substantial anti-theft security for vehicles.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a top side view, in perspective, of one embodiment of the present lock assembly shown in use.

FIG. 2 is a side plan view of the embodiment shown in FIG. 1.

FIG. 3 is a plan view taken along line 3—3 of FIG. 2.

FIG. 4 is a plan view taken along line 4—4 of FIG. 2.

FIG. 5 is an exploded view, in perspective, of the embodiment of the present lock assembly illustrated in use in FIG. 1.

DESCRIPTION OF THE PREFERRED EMBODIMENT

Referring now to the drawings, lock assembly, shown generally at 10, includes flat plate 12, which is secured, e.g., welded, to elongated member 14, which is secured to top plate 16. Extending upwardly from top plate 16 are mutually parallel walls 18 and 20, each of which are secured to and normal to top plate 16. Wall 18 includes first and second holes 22 and 24 therethrough. Similarly, wall 20 has third and fourth holes 26 and 28 through it. Each of holes 22, 24, 26 and 28 extend an equal distance from top plate 16. Locking hook 30 of key operated pad-lock 32 is adapted to be capable to pass through each of holes 22, 24, 26 and 28, and then be engaged by and locked into key operated pad-lock 32.

In use, lock assembly 10 is positioned as shown in FIGS. 1, 2, 3, and 4. Flat plate 12 is placed in contact with vehicle floor 34. Flat plate 12 has a relatively large cross sectional area, e.g., relative to the cross sectional area of elongated member 14 or top plate 16, to aid in securing lock assembly 10 in place while in use. Pedal shaft 36, associated with brake pedal 38, is shown extending through vehicle floor 34. Of course, pedal shaft 36 is also associated with the other portions of the brake mechanism (not shown) which functions to control the braking of the vehicle.

Flat plate 12 is positioned on vehicle floor 34 so that the bottom of shaft 36 is in contact with, or immediately above top plate 16. Walls 18 and 20 are spaced apart so that the two sides of shaft 36 are in contact with, or immediately adjacent to, walls 18 and 20, respectively. Thus positioned, shaft 36 is substantially snugly cradled by top plate 16 and walls 18 and 20. Holes 22, 24, 26 and 28 are located a distance up from top plate 16 so that when lock hook 30 is inserted through holes 22, 24, 26 and 28, and engaged by and locked into key operated pad-lock 32, lock hook 30 is in contact with, or immediately above, the top of shaft 36 (as most clearly shown in FIG. 4). With lock hook 30 so locked into key operated pad-lock 32, shaft 36 is effectively immobilized and the brake pedal and brake mechanism rendered inoperative. A thief, even if he or she had succeeded in starting the vehicle, would be unable to operate the brake pedal with lock assembly 10 in place, as described above. Of course, lock assembly 10 may be used on the foot pedal mechanism used to control the acceleration and clutching of the vehicle as well as the brake pedal mechanism illustrated.

To remove lock assembly 10 from the locking position around shaft 36, described above, the vehicle owner (e.g., in preparation for driving the vehicle) uses his or her key to unlock key operated pad-lock 32. Lock hook 30 is removed from holes 22, 24, 26 and 28, and the remainder of lock assembly 10 is easily removed from around shaft 36, which is now fully operational. Lock assembly 10 is conveniently stored, between uses, in one piece by again passing lock hook 30 through holes 22, 24, 26 and 28 and locking lock hook 30 into key operated pad-lock 32.

While this invention has been described with respect to various specific examples and embodiments, it is to be understood that the invention is not limited thereto and that it can be variously practiced within the scope of the following claims.

What is claimed is:

1. An apparatus useful for substantially immobilizing the shaft of a foot pedal assembly normally necessary to completely control the operation of a vehicle having a floor, said apparatus comprising base means being a rigid structure, and having a first end and a second end, said first end having a larger cross sectional area than said second end, and said base means being sized to fit between said floor and said shaft, provided that in use said first end is in contact with said floor, first wall means and second wall means each extending upwardly from said second end of said base means and being spaced apart so as to be capable of cradling said shaft between said first and second wall means and said second end of said base means, each of said first and second wall means having a pair of holes therethrough equidistant up from said second end of said base means, lock means capable of passing through at least one of said holes in each of said first and second wall means to thereby effectively lock said shaft in said cradled position and rendering said foot pedal assembly effectively inoperative.

* * * * *